United States Patent [19]

Hyllberg et al.

[11] Patent Number: 5,420,395
[45] Date of Patent: May 30, 1995

[54] CERAMIC HEATER ROLLER WITH ZONE HEATING

[75] Inventors: Bruce E. Hyllberg, Gurnee, Ill.; Robert G. Langley, Burlington, Wis.

[73] Assignee: American Roller Company, Bannockburn, Ill.

[21] Appl. No.: 84,650

[22] Filed: Jun. 28, 1993

Related U.S. Application Data

[63] Continuation-in-part of Ser. No. 973,447, Nov. 9, 1992, Ser. No. 3,156, Jan. 12, 1993, abandoned, and Ser. No. 71,135, Jun. 2, 1993.

[51] Int. Cl.⁶ .................. H05B 3/00; H05B 3/14; G03G 15/20
[52] U.S. Cl. ...................... 219/470; 492/46
[58] Field of Search .............. 219/469–471, 219/216, 388; 492/46, 38, 49

[56] References Cited

U.S. PATENT DOCUMENTS

| | | | |
|---|---|---|---|
| 3,310,655 | 3/1967 | Hager, Jr. .................. | 219/471 |
| 3,805,020 | 4/1974 | Bates ........................ | 219/469 |
| 4,535,230 | 8/1985 | Brieu ........................ | 219/469 |
| 4,560,860 | 12/1985 | Fauser ....................... | 219/470 |
| 4,618,240 | 10/1986 | Sakurai et al. ............ | 219/216 |
| 4,628,183 | 12/1986 | Satomura ................... | 219/469 |
| 4,801,968 | 1/1989 | Kogure et al. ............. | 219/216 |
| 4,883,941 | 11/1989 | Martin et al. ............. | 219/216 |
| 4,888,464 | 12/1989 | Shibata et al. ............ | 219/469 |
| 5,041,718 | 8/1991 | d'Hondt et al. ........... | 219/216 |

FOREIGN PATENT DOCUMENTS

| | | | |
|---|---|---|---|
| 0426072 | 5/1991 | European Pat. Off. . | |
| 0455069 | 11/1991 | European Pat. Off. . | |
| 1157100 | 5/1958 | France ....................... | 219/469 |
| 3500557 | 7/1986 | Germany . | |
| 56-109381 | 8/1981 | Japan . | |
| 58-172670 | 10/1983 | Japan . | |
| 58-221875 | 12/1983 | Japan . | |
| 59-171978 | 9/1984 | Japan . | |
| 60-263179 | 12/1985 | Japan . | |
| 62-215982 | 9/1987 | Japan . | |
| 4-91912 | 3/1992 | Japan ........................ | 492/46 |

*Primary Examiner*—John A. Jeffery
*Attorney, Agent, or Firm*—Quarles & Brady

[57] ABSTRACT

A thermal conductive roller for use in copying machines, steam-heated and induction-heated applications includes a ceramic heating layer formed by plasma spraying a ceramic material. Conductive bands are provided for supplying electrical current to portions of the ceramic heating layer. In one embodiment, heat is generated by passing current through a length of the roller between two narrow bands. In a second embodiment, heat is generated by directing current radially from the core of the roller to an outer ground layer through wide bands corresponding to heating zones for the roller. In a third embodiment, the ceramic layer is inside the steel core.

9 Claims, 3 Drawing Sheets

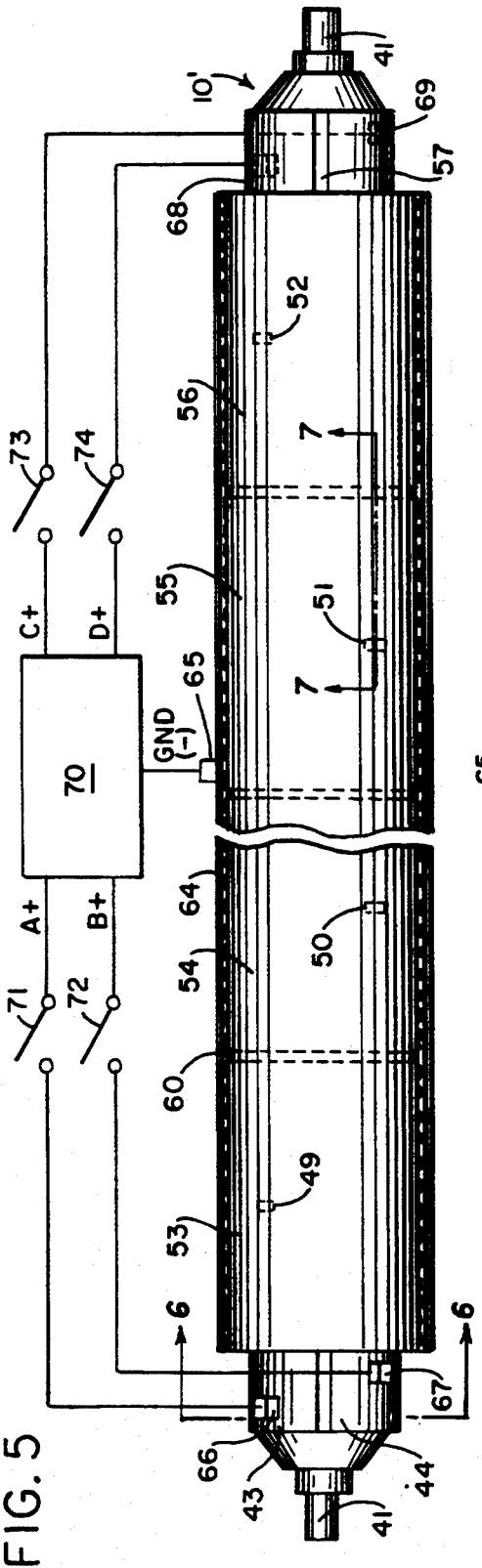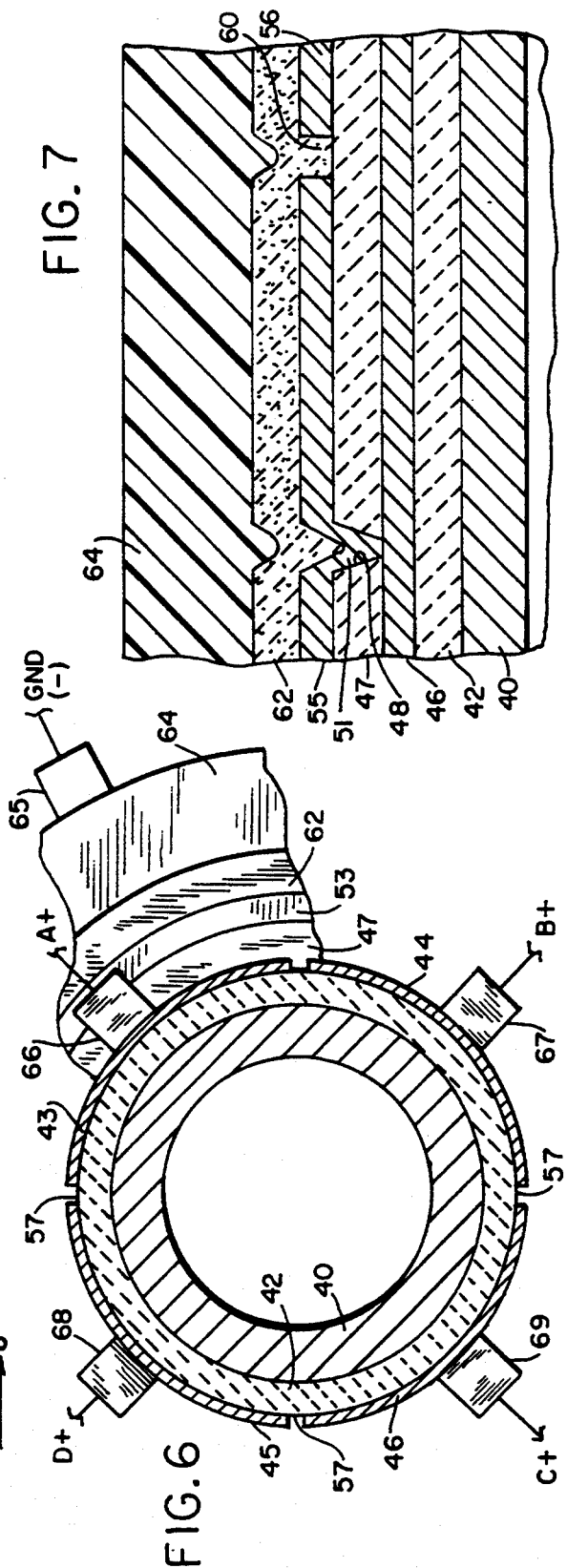

CERAMIC HEATER ROLLER WITH ZONE HEATING

CROSS-REFERENCE TO RELATED APPLICATION

This is a continuation-in-part of my U.S. patent applications, Ser. No. 07/973,447, filed Nov. 9, 1992, and Ser. No. 08/003,156, filed Jan. 12, 1993, now abandoned and Ser. No. 08/071,135, filed Jun. 2, 1993.

TECHNICAL FIELD

The invention relates to heater rollers for use in a variety of industrial machines.

BACKGROUND ART

Steam-heated and induction-heated rollers are used in the paper making, printing, paper, film, and foil converting industries. Some examples are: web heating rollers, drying rollers and drums, laminating rollers, embossing rollers, and cast film extrusion rollers.

Steam-heated rollers act as pressure vessels at higher temperatures. The internal construction of both steam-heated and induction-heated cores can be quite complex and expensive in order to provide the temperature uniformity needed. In addition, a considerable amount of auxiliary equipment is needed to power or heat the roller.

Internally heated fuser rollers are used in the copier industry. The fuser roller melts the toner and presses it into the paper. The typical fuser roller consists of an aluminum or non-magnetic metal core with an internal quartz heating lamp. The inner diameter of the core has a special coating to absorb heat from the lamp. The roller is coated with a non-stick elastomeric material (e.g., silicone rubber) to provide a pressure nip with an opposing roller and to release the toner to the paper.

The core construction is quite complex and expensive. The quartz lamp is fragile, has a limited useful life, and does not provide a uniform temperature distribution to the core.

A technical problem in the technology is the non-uniform temperature across the roller face when the width of the paper sheet or web is smaller than the heated length of the roller. The ends of the roller operate at a higher temperature than the portion covered by paper or sheet or web, which tends to dissipate heat from the covered portion of the roller. The higher temperature at the ends causes increased aging if the outermost covering is organic.

Heating rollers for xerography and other applications with multiple heating elements are disclosed in the following U.S. Patents, Sakurai, et al., U.S. Pat. No. 4,618,240; Kogure, et al., U.S. Pat. No. 4,801,968; Martin, et al., U.S. Pat. No. 4,883,941; Hager, U.S. Pat. No. 3,310,655, and d'Hondt, et al., U.S. Pat. No. 5,041,718.

It is typical in heater rollers to apply a voltage potential at one end of the heating layer and a ground potential at the other end of the heating layer to produce a current in the heating layer.

For example, in Satomura, U.S. Pat. No. 4,628,183, one side of a voltage supply is applied to one set of conductive fingers in a ceramic heating layer, while the other side of the voltage supply is applied to another set of conductive fingers in the ceramic heating layer. The two sets of fingers are interdigitated and electrical current is produced in the heating layer between the two sets of fingers.

The ceramic material is a baked ceramic material in which the conductive electrodes are sandwiched between two ceramic layers.

The present invention is directed to improved constructions of heater rollers for zone heating of a ceramic, resistive heating layer.

SUMMARY OF THE INVENTION

The invention generally relates to a ceramic thermal conduction roller with zone heating, the roller having a central heating zone of varying length or multiple heating zones formed as longitudinal segments along its length.

A first type of roller applies heating in the central web-carrying portion of the roller, which is adjustable in width for different sized webs.

In this type of roller, a first pair of conductors run along the roller core, the first pair of conductors being separated and electrically insulated from each other and having ends adapted for connection to electrical terminals external to the roller. A first ceramic layer is disposed to cover a cylindrical surface formed by the cylindrical core and a second ceramic layer is disposed to cover the first ceramic layer, the second ceramic layer being at least semiconductive of electrical current to allow resistive heating of the roller.

A first pair of conductive bands are spaced apart along the length of the roller, extending circumferentially in relation to the roller core and contacting the heating layer. The conductors, the conductive bands and the ceramic heating layer form a circuit to cause heating in the ceramic layer in at least one longitudinal zone of the roller that is less than the longest heatable portion of the roller.

In a second type of zone heating roller, the heating zones are formed as multiple longitudinal segments along the roller. A positive electrical potential is applied near the core and current is conducted radially outward to a layer that is connected to an electrical ground. In this embodiment, the conductive bands are quite wide as they underlie and correspond to the width of the zone being heated. In a third embodiment, the invention is demonstrated as applicable to rollers with ceramic layers formed around the inside diameter of the steel core.

Other objects and advantages, besides those discussed above, will be apparent from the description of the preferred embodiment that follows. In the description, reference is made to the accompanying drawings, which form a part hereof, and which illustrate examples of the invention. Such examples, however, are not exhaustive of the various embodiments of the invention, and, therefore, reference is made to the claims which follow the description for determining the scope of the invention.

BRIEF DESCRIPTION OF THE DRAWINGS

FIG. 5 is a front elevational view of a second embodiment of the roller of the present invention;

FIG. 6 is a cross sectional view taken in the plane indicated by line 6—6 in FIG. 5; and FIG. 7 is a sectional view taken in the plane indicated by line 7—7 in FIG. 5.

DETAILED DESCRIPTION OF THE PREFERRED EMBODIMENT

Figure 1:
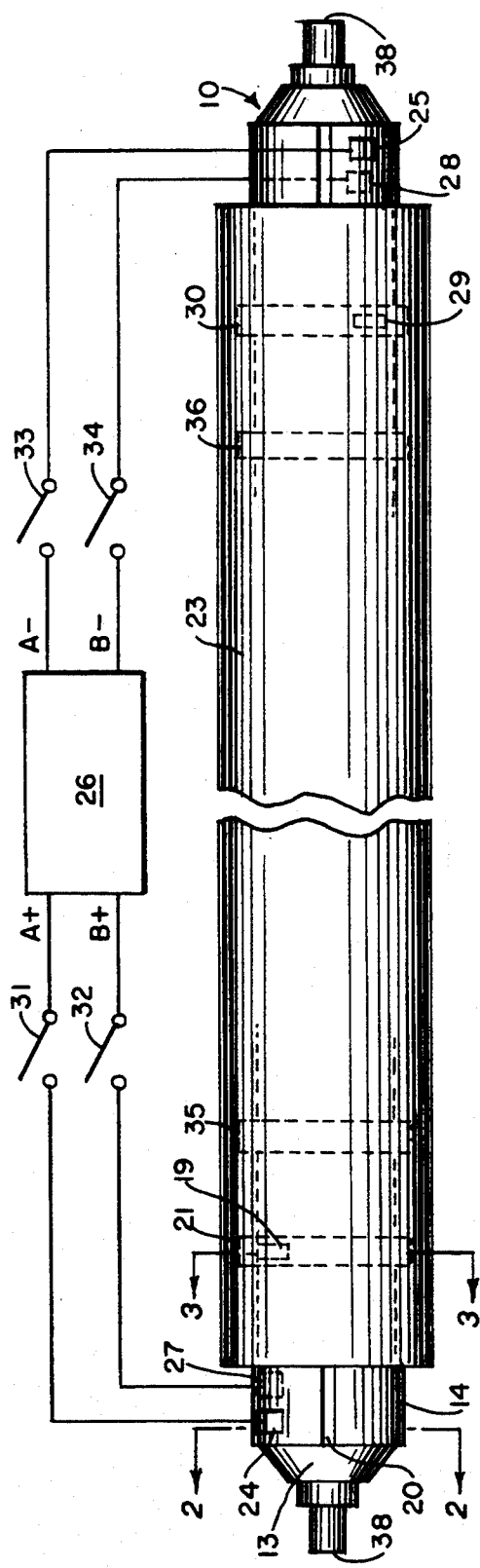
FIG. 1 is a front elevational view of a first embodiment of the roller of the present invention.

FIG. 1 shows a preferred embodiment of a heater roller 10 of a type for use in copying machines, or in other industrial applications, such as steam-heated or induction-heated rollers for the printing, paper, film, and foil converting industries.

The finished roller 10 includes a hollow cylindrical core 11 (FIG. 2) with suitable journal shafts 38 (FIG. 1) for disposition in suitable machine bearing structures of a type known in the art. The core material in the preferred embodiment is aluminum, but stainless steel, brass, some steels, glass, or an FRP composite type material can also be used.

Figure 2:
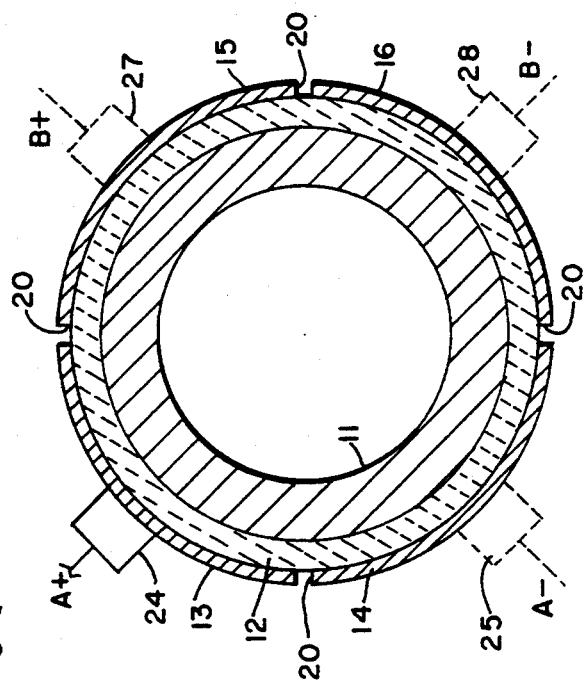
FIG. 2 is a cross sectional view taken in the plane indicated by line 2—2 in FIG. 1.
Figure 4:
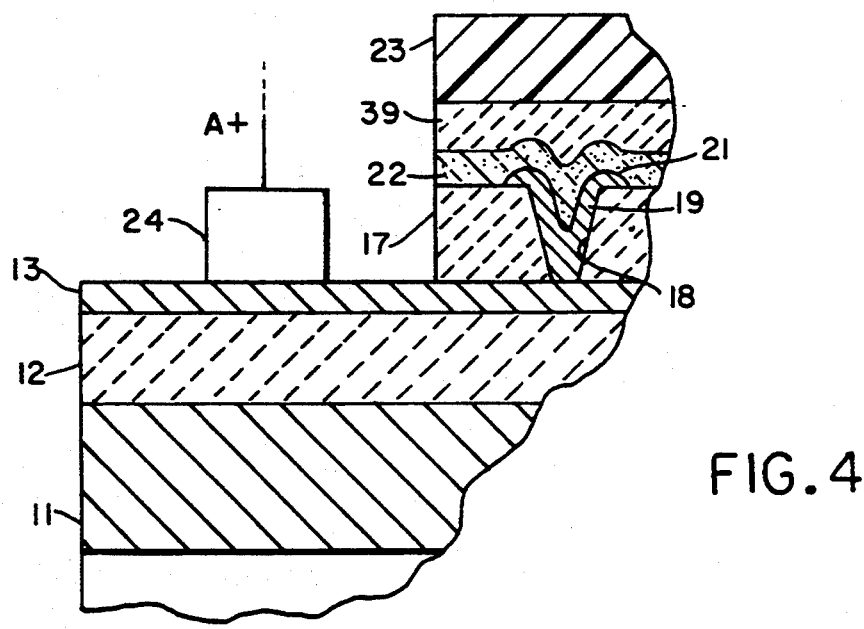
FIG. 4 is a left end fragment of a longitudinal section of the roller of FIG. 1.

If the core 11 includes a conducting material such as aluminum, a thin layer of ceramic insulating material 12 of approximately 10 mils thickness (1 mil=0.001 inches) is formed over the full outer surface of the core 11 (FIGS. 2 and 4). The thickness is selected to provide electrical isolation from ground at the temperature and voltage at which the roller is used. This insulating layer 12 can be formed by plasma spraying with an alumina ceramic powder, such as Metco 101 or 105, or preferably zirconia, Metco 201 or 204, available from Metco Corp., Westbury, N.Y., U.S.A. Zirconia can be used as an electrically insulating barrier coating a few mils thick. In thicker layers, zirconia is an effective thermal barrier coating due to its low thermal conductivity. It can be plasma sprayed in layers of 250 mils thick ($\frac{1}{4}$ inch) or greater.

Next, a plurality of metallic electrode strips 13, 14, 15 and 16 (FIGS. 1 and 2) are formed by plasma spraying a layer of nickel-aluminide, nickel, aluminum, zinc, nickel-chromium or stainless steel to a thickness of approximately 2 mils, or such other suitable thickness for carrying the necessary electrical heating current.

The four metallic electrode strips 13, 14, 15 and 16, each occupy a one-quarter longitudinal section of the cylindrical surface of the roller core 11. Before spraying, strips of a tape of $\frac{1}{4}$ inch or less are applied every 90° around the roller core to define the longitudinal quarter sections. This tape can be a fiberglass tape, a fiberglass-reinforced silicone tape or a metal foil tape, which will withstand plasma spraying. After spraying the tape is removed to create spaces 20 (FIG. 2) between the electrodes that separate and electrically insulate the electrode strips 13, 14, 15 and 16 from one another.

Next, a second ceramic insulating layer 17 of 10 mils in thickness (FIG. 3) is formed over the outer surface of the strips 13, 14, 15 and 16. This layer can be made of the same material and in the same thickness as the first insulating layer 12. This layer 17 has four small areas which are masked to provide apertures 18 in the layer 17 when the masks are removed. Each aperture 18 leads to one of the four electrode strips 13, 14, 15, 16. The insulating layer 17 is shorter on the ends than the electrode strips 13, 14, 15 and 16, so that the ends of the strips 13-16 are exposed as seen in FIG. 1.

The next layer to be applied is a sprayed metal layer of the same materials as were used for the strip electrodes. The sprayed metal forms feedthrough plugs 19 which fill the apertures 18. Areas on the insulating layer 17 are masked to define conductive bands or rings 21, 30 and 35-36 encircling the roller core 11. Each band or ring 21, 30 and 35-36 connects to a respective feedthrough 19, and to a respective strip electrode 13, 14, 15 or 16.

Figure 3:
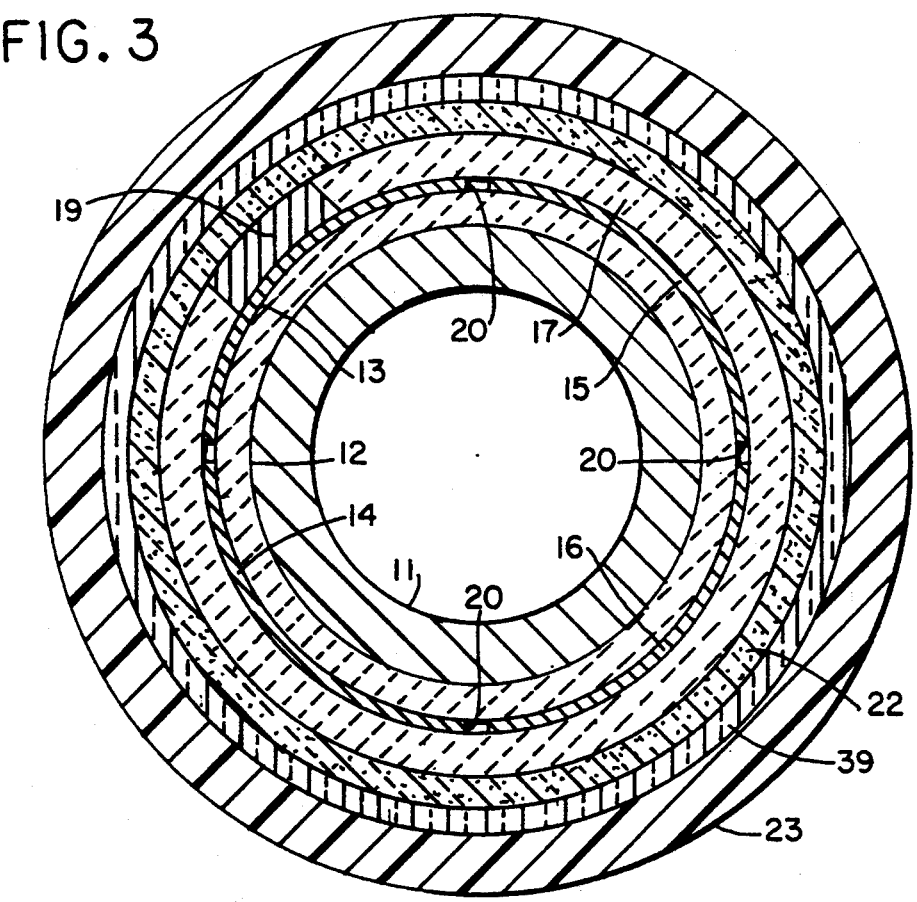
FIG. 3 is a cross sectional view taken in the plane indicated by line 3—3 in FIG. 1.

This is followed by applying a semiconductive ceramic heater layer 22 (FIGS. 3 and 4). The thickness is based on the area to be heated, operating temperature, and power supply voltage. In this example, the thickness is approximately 2 mils.

The outer surface of the roller is provided by a functional layer 23 of silicone rubber, ceramic, or tungsten carbide or a metal sleeve. If the outer functional layer 23 is formed of an electrical conductor, such as stainless steel, nickel, or tungsten carbide/cobalt composite, this outer layer 23 is connected to a grounded negative (−) side of the power supply (FIG. 5). If the outer layer 23 is made of metal, it can be insulated from the heater layer by an insulating ceramic layer 39 (FIGS. 3 and 4).

The second insulating layer 17 and the ceramic heater layer 22 are made shorter than the strip electrodes 13, 14, 15 and 16. The electrodes 13-16 are thus exposed at their ends for contact by electrical brushes, represented by elements 24 and 25.

The brushes 24 and 25 rotate with their respective electrodes 13, 14 to maintain contact with electrodes 13, 14. The brushes 24, 25 can be arranged to slide on the inside of a ring or race encircling the exposed end of the roller. Thus, it should be understood that FIG. 1 is a schematic diagram insofar as brushes 24, 25 are shown electrically connected to the first positive (A+) voltage terminal of voltage source 26 and first negative (A−) (ground) terminal of voltage source 26.

Brush 24 contacts an electrode strip 13 (FIGS. 1 and 2) to place positive voltage (A+) on that electrode 13 while brush 25 contacts the second electrode strip 14 (FIG. 2) to place voltage (A−) on that electrode 14. Two more brushes 27, 28 (shown in phantom in FIGS. 1 and 2) would contact the other two electrode strips 15, 16 at opposite ends of roller 10 and rotate with elements 15, 16 to apply voltage (B+) on electrode 15 and voltage (B−) on electrode 16. As used herein, the term "brushes" should be understood to include all types of devices for making electrical contact with roller surfaces.

The voltage source 26 may supply either AC or DC voltage. Switches 31-34 (FIG. 1) are provided to apply either voltage A to the roller 10 or voltage B. When voltage A is applied, current is conducted through strips 13, 14, feedthroughs 19, 29 and conductive bands 21, 30 and through a length of ceramic layer 22 between bands 21 and 30. When voltage B is applied, current is conducted through strips 15, 16, feedthroughs (not shown) and conductive bands 35, 36 and through a length of ceramic layer 22 between bands 35 and 36. When voltage B is applied, the length of the roller 10 that is subjected to primary heating is shorter than in the case where voltage A is applied. This may be used to control heating along the length of the roller 10 and at the ends of the roller 10.

The minimum number of bands for practicing this embodiment of the invention is two. By moving the two bands towards the longitudinal center of the roller, different heating characteristics may be provided. With four bands, heating becomes selectable and switchable without changing rollers.

The preferred material for the ceramic heating layer 22 is titanium dioxide, such as Metco 102 ceramic powder. This is commercially available from Metco Corp., Westbury, N.Y., U.S.A. Titanium dioxide ($TiO_2$) is normally an electrical insulating material. However, when the material is plasma-sprayed, some of the dioxide form is chemically reduced to a conductive suboxide (mono-oxide) form, rendering the deposited coating electrically semiconductive.

As used herein, the term "conductive" material shall mean a material with a volume resistivity of $10^3$ ohm-centimeters or less. The term "insulating" material shall mean a material with a volume resistivity of $10^{10}$ ohm-centimeters or greater. As used herein, the term "semiconductive" material shall mean a material with a volume resistivity between $10^3$ ohm-centimeters and $10^{10}$ ohm-centimeters. Chromium oxide is an example of a semiconductive or lower resistance ceramic material. The unsprayed powder is $Cr_2O_3$; after spraying the material may be CrO or $CrO_2$.

Titanium dioxide can be used as the only component of the heater layer or it can be blended with other ceramics or metals to increase or decrease the volume resistivity of the final coating. For example, insulating ceramics such as zirconia or alumina can be blended with semiconductive ceramics such as chromium oxide, or with conductive metals such as nickel, milled steel, stainless steel or other alloys, or aluminum.

Plasma spraying of a ceramic-metal mixture changes the porosity of the ceramic coating to reduce thermally induced stress during its service life, and minimizes thermal expansion differences between the metallic core and ceramic layers over the usable temperature range of the roller.

Plasma spraying, which is one type of thermal spraying, is advantageous in adjusting the thickness of the coating to control the electrical resistance of the titanium dioxide portion of the heater layer.

For any ceramic layer containing titania (titanium dioxide), the resistance of the layer is also affected by the spraying conditions. Titania can be partially reduced to a suboxide by the presence of hydrogen or other reducing agents in the plasma flame. It is the suboxide (probably TiO rather than $TiO_2$) that is the semiconductor in the ceramic layer 22. Titanium dioxide is normally a dielectric material. The typical average chemical composition of titanium dioxide is 1.8 oxygen per molecule rather than 2.0 in a plasma sprayed coating. This level (and thus the coating properties) can be adjusted to some extent by raising or lowering the percentage of hydrogen in the plasma flame. The normal primary gas is nitrogen or argon while the secondary gas is hydrogen or helium. The secondary gas raises the ionization potential of the mixture, thus increasing the power level at a given electrode current. For a typical Metco plasma gun, the hydrogen level is adjusted to maintain the electrode voltage in the gun between 74 and 80 volts.

Regardless of the mixture of powders used, the plasma spray parameters should be suitably adjusted to insure that the blend of materials in the finished ceramic layer 22 is the same as intended. All of the powders mentioned do not require the same power levels, spray distance, and other parameters. Thus, adjustment of spray distance, for example, may increase the deposit efficiency of one powder over the other and change the material blend in the finished coating.

Plasma sprayed ceramic coatings can be applied in one pass (layer) of the plasma gun or in multiple passes. The normal method for most types of coating applications is to apply multiple thin coatings of ceramic and build up to the required thickness. Although the ceramic layer described above has a uniform ceramic composition, the sublayers of ceramic in the resulting layer 22 do not have to have the same composition.

The hydrogen level can be varied during the application of each spray pass to apply a titanium dioxide layer that has a non-uniform electrical resistance from end to end of the roller. This would normally be done to apply more heat to the ends of the roller, where the heat losses are greater, to achieve a uniform temperature across the roller face in its functional environment.

The thickness of the heater layer 22 can be adjusted to provide the appropriate resistance for the application. The heater layer 22 may vary in total thickness from about 1 mil to about 100 mils depending on the roller diameter and length, operating temperature, wattage throughput and power supply voltage. In the preferred embodiment, the heater layer 22 is approximately 2 mils thick.

Plasma-sprayed ceramic can be applied in very thin layers (at least as low as 0.1 mil per spray pass). For many heating applications, the heater layer formed by plasma-spraying thin layers will provide a minimal temperature variation due to thickness variation of the resulting layer.

The temperature uniformity depends primarily on the thickness uniformity of the heater layer. Since the heater layer is composed of many, thin layers or spray passes, material variation is generally not an issue.

Precise control of the heater layer thickness can be achieved by conventional grinding of the ceramic layer.

The outer layer 23 can be metal, ceramic, or silicone rubber alone, or the outer layer 23 can comprise ceramic or silicone rubber formed over a replaceable metal sleeve. In one example, the ceramic 22 is sealed, and an outer functional layer, preferably silicone rubber is bonded to the electroplate, which is deposited on the outer surface of the ceramic heater layer 22. The electroplate must not contact the core.

The outer functional layer 23 can be plasma sprayed metal, provided that the metallic layer is insulated from the heater layer 22 by an insulating ceramic layer 39 of 10 mils thickness. The outer functional layer 23 would be plasma sprayed and bonded to the ceramic insulating layer 39. Such outer metallic layer 23 would preferably be a nickel alloy, stainless steel, low resistance ceramic or tungsten carbide composite.

The outer functional layer 23 may be formed over a metallic sleeve of nickel, steel, or aluminum, that is removable and replaceable. The outer functional layer 23 is then bonded to the replaceable sleeve. The ceramic heater layer 22 would be ground and sealed in this case to provide control of the diameter of the roller prior to fitting of the metallic sleeve. If the outer functional layer 23 is damaged or wears out, the roller can be returned to service simply by installing a new sleeve.

In a second embodiment seen in FIGS. 5, 6 and 7, current flows in a radial direction from elements 43–46 near the core 40 to an outer grounded layer 64. As seen in FIG. 6, the roller 10' is formed around a hollow, cylindrical metal core 40, which extends between suitable journal shafts 41 for supporting the roller 10' in suitable journal bearings. An insulating ceramic layer 42 is formed to cover the main body of the core 10, excluding end caps and journal shafts 41. This layer 42 is formed in the manner described for layer 12 in the first embodiment.

Four conductive strips 43, 44, 45 and 46, similar to strips 13–16 in FIGS. 1–4, extend longitudinally over the surface of layer 42, each covering slightly less than a 90-degree quadrant of the circumference of layer 42, the strips 43–46 being electrically separated by narrow gaps 57 formed by masking operations. A second ceramic insulating layer 47, like layer 17 in FIGS. 1–4, is disposed over and around the four metallic strips 43–46, except for the opposite ends of the strips 43–46, which remain exposed.

The insulating layer 47 is formed with apertures 48, which are then filled by feedthrough conductors 49, 50, 51 and 52, similar to the formation of conductors 19, 29 in FIGS. 1 and 4. Next, a metallic conductive layer divided into four wide bands 53, 54, 55 and 56 is disposed over and around the insulating layer 47, each band 53, 54, 55 and 56 being connected to a respective one of the feedthrough conductors 49, 50, 51 and 52, and the bands being separated by relatively narrower gaps 60 formed by masking narrow bands between the conductive bands 53, 54, 55 and 56. Thus, each band 53, 54, 55 and 56 covers just under one-quarter of the circumference of the roller 10' excluding the exposed ends of strips 43–46.

A ceramic heater layer 62 is formed as described for layer 22 in FIGS. 3 and 4, and is disposed around the circumference of the roller core to cover conductive bands 53, 54, 55 and 56. An outer functional layer 64 can then be formed of a metal sleeve which is disposed over and around the ceramic heater layer 62. An outer functional layer can be also be formed of silicone rubber or ceramic placed over a grounded metal layer such as layer 64.

A voltage source 70 in FIG. 5 supplies positive voltages A+, B+, C+ and D+ through switches 71–74 to electrical brushes 66–69 which contact respective electrode strips 43–46. It should be understood that the electrical connection of brushes 66–69 is schematic in nature, and that mechanically, the brushes 66–69 would rotate with the roller 10' within rings or races encircling the ends of the roller 10'. The brushes 66–69 apply a positive voltage near the insulated core 40 of the roller. A fifth brush 65 contacts the metallic layer 64 to hold it at ground potential. Current flows between the electrode strips 43–46 and the outer functional layer 64 through wide conductive bands 53–56 and corresponding areas of the ceramic heater layer 62. By applying the B+ and C+ voltages through the middle bands 54, 55, only a middle portion of the roller 10' is heated. By adding the A+ and D+ voltages through the outside bands 53, 56 the effective length of the roller 10' is heated.

The minimum number of bands for practicing this embodiment of the invention is two. By varying the width of two bands along the length of the roller, different heating characteristics may be provided. With four bands, heating becomes selectable and switchable without changing rollers. The various zones can also be maintained at the same or different temperatures rather than just being active or non-active.

It should also be apparent that the zone heating concepts of the present invention are applicable to a roller with layers formed around an outside diameter, or a roller with layers formed around an inside diameter.

This has been a description of examples of how the invention can be carried out. Those of ordinary skill in the art will recognize that various details may be modified in arriving at other detailed embodiments, and these embodiments will come within the scope of the invention.

Therefore, to apprise the public of the scope of the invention and the embodiments covered by the invention, the following claims are made.

I claim:

1. A thermal conduction roller for use in a machine, the thermal conduction roller providing zones in which heating of the roller is controlled, the thermal conduction roller comprising:
   a longitudinally extending, cylindrical roller core;
   a first pair of conductors running along the roller core, the first pair of conductors being separated and electrically insulated from each other and having ends adapted for connection to electrical terminals external to the roller;
   a first ceramic layer disposed to cover a cylindrical surface formed by the cylindrical core;
   a second ceramic layer disposed to cover the first ceramic layer, the second ceramic layer being at least semiconductive of electrical current to allow resistive heating of the roller;
   a first pair of conductive bands extending around an outer diameter of the roller core and electrically contacting the second ceramic layer, the conductive bands being spaced apart along the length of the roller and the conductive bands extending circumferentially in relation to the roller core; and
   wherein the conductors, the conductive bands and the ceramic heater layer form a circuit to cause heating in the ceramic layer in at least one longitudinal zone of the roller that is less than the longest heatable portion of the roller; and
   wherein the first pair of conductors are a first pair of conductive strips that are separated and electrically insulated from each other and have exposed ends adapted for contact by respective electrical contacts which are electrically connected to electrical terminals external to the roller.

2. The roller of claim 1, wherein the conductive bands run around an inside diameter of the roller core.

3. The roller of claim 2, wherein the conductive bands each have a width that is a smaller dimension than a space provided between the conductive bands.

4. The roller of claim 1, wherein the conductive bands each have a width that is a greater dimension than a space provided between the conductive bands.

5. The roller of claim 1, further comprising
   a second pair of conductive bands electrically contacting the heater layer, the second pair of conductive bands being disposed between the first pair of conductive bands and spaced along the length of the roller from each other and from the first pair of conductive bands;
   wherein the second pair of conductive bands are electrically connected to the second ceramic layer to provide a second heating zone of shorter longitudinal dimension than a first heating zone provided between the first pair of conductive bands.

6. The roller of claim 1, further comprising:
   a second pair of conductive bands extending around an outer diameter of the roller core and electrically contacting the heater layer, the conductive bands being spaced apart along the length of the roller and the conductive bands extending circumferentially in relation to the roller core; and a second pair of conductive strips electrically connected to the second pair of conductive bands and separated and electrically insulated from each other and having exposed ends adapted for contact by respective electrical contacts which are electrically connected to the external terminals.

7. A thermal conduction roller for use in a machine, the roller receiving electrical current through a plurality of electrical contacts, the roller comprising:

a longitudinally extending, cylindrical roller core;

a plurality of longitudinal conductors running lengthwise along the insulated roller core, the longitudinal conductors being separated and electrically insulated from each other and having exposed ends adapted for electrical connection to an external power source, wherein an electrical potential may be applied across the plurality of longitudinal conductors;

a ceramic layer disposed to cover a cylindrical surface formed by the core without covering the exposed ends of the longitudinal conductors;

a second ceramic layer disposed to cover the first ceramic layer, the second ceramic layer being at least semiconductive of electrical current to allow resistive heating of the roller; and a plurality of conductive bands which contact the ceramic heater layer and extend circumferentially in relation to the roller core towards opposite ends of the roller, wherein the conductive bands connect to respective longitudinal conductors;

wherein the plurality of longitudinal conductors includes at least four longitudinal conductors running lengthwise along the roller core, the four longitudinal conductors being separated and electrically insulated from each other and having exposed ends adapted for electrical contacts; and wherein the plurality of conductive bands includes at least four conductive bands which are disposed along the length of the roller.

8. The roller of claim 7, wherein the plurality of conductive bands are spaced a distance apart that is less than the width of each conductive band.

9. The roller of claim 10, further comprising an outer ground layer which is disposed to cover the ceramic heater layer and the conductive bands, so that current flows radially outward through each of the conductive bands to heat a portion of the roller defined by the longitudinal extent of the conductive bands along the length of the roller core.

* * * * *

UNITED STATES PATENT AND TRADEMARK OFFICE
CERTIFICATE OF CORRECTION

PATENT NO. : 5,420,395
DATED      : May 30, 1995
INVENTOR(S) : Hyllberg, et al

It is certified that error appears in the above-indentified patent and that said Letters Patent is hereby corrected as shown below:

Col. 4, line 6      "19" should be --19, 29--.

Col. 6, line 50     "ceramic" should be --cermet--.

Col. 10, line 21    "10" should be --8--.

Signed and Sealed this

Twenty-ninth Day of August, 1995

BRUCE LEHMAN

Attest:

Attesting Officer          Commissioner of Patents and Trademarks